(12) United States Patent
Severinsson et al.

(10) Patent No.: US 10,711,846 B2
(45) Date of Patent: Jul. 14, 2020

(54) HYDRAULIC COUPLING

(71) Applicant: BorgWarner Sweden AB, Landskrona (SE)

(72) Inventors: Lars Severinsson, Hishult (SE); Bo Lundström, Glumslöv (SE)

(73) Assignee: BorgWarner Sweden AB, Landskrona (SE)

( * ) Notice: Subject to any disclaimer, the term of this patent is extended or adjusted under 35 U.S.C. 154(b) by 269 days.

(21) Appl. No.: 15/577,106

(22) PCT Filed: Jun. 2, 2016

(86) PCT No.: PCT/EP2016/062453
§ 371 (c)(1),
(2) Date: Nov. 27, 2017

(87) PCT Pub. No.: WO2016/193347
PCT Pub. Date: Dec. 8, 2016

(65) Prior Publication Data
US 2018/0172083 A1    Jun. 21, 2018

(30) Foreign Application Priority Data

Jun. 3, 2015  (SE) .................................... 1550719

(51) Int. Cl.
*F16H 25/20*  (2006.01)
*F15B 15/06*  (2006.01)
(Continued)

(52) U.S. Cl.
CPC ........ *F16D 25/0638* (2013.01); *F15B 15/065* (2013.01); *F16D 13/52* (2013.01);
(Continued)

(58) Field of Classification Search
CPC .. F16D 25/0638; F16D 13/52; F16D 2129/02; F16D 2127/06; F16H 25/20; F16H 19/04; F15B 15/065
See application file for complete search history.

(56) References Cited

U.S. PATENT DOCUMENTS

| | | | |
|---|---|---|---|
| 8,875,863 B2 * | 11/2014 | Nakano | F16D 25/0638 192/114 R |
| 2008/0214355 A1 * | 9/2008 | Capito | B60K 17/351 477/86 |

(Continued)

FOREIGN PATENT DOCUMENTS

| | | |
|---|---|---|
| DE | 10318423 A1 | 11/2003 |
| GB | 2406178 A | 3/2005 |

(Continued)

*Primary Examiner* — David J Hlavka
(74) *Attorney, Agent, or Firm* — Young Basile Hanlon & MacFarlane, P.C.

(57) ABSTRACT

A hydraulic disc coupling (1) for a system distributing torque between the left and right wheels and/or the front and rear axles of a vehicle is provided. A coupling piston (6) is configured to be mechanically locked by an integrated locking arrangement (23), when the coupling piston (6) is actuated to act on the disc package (8), such that the coupling remains engaged whereby the input (2) is connected to the output (7) of the coupling (1) without hydraulic pressure acting on the coupling piston (6). Unlocking of the integrated locking arrangement (23) is provided by again actuating the coupling piston (6).

16 Claims, 8 Drawing Sheets

(51) Int. Cl.
  *F16D 25/0638* (2006.01)
  *F16D 13/52* (2006.01)
  *F16H 19/04* (2006.01)
  *F16D 127/06* (2012.01)
  *F16D 129/02* (2012.01)

(52) U.S. Cl.
  CPC ............ *F16H 19/04* (2013.01); *F16H 25/20* (2013.01); *F16D 2127/06* (2013.01); *F16D 2129/02* (2013.01)

(56) References Cited

U.S. PATENT DOCUMENTS

| | | | |
|---|---|---|---|
| 2008/0314711 A1* | 12/2008 | Jayaram | F16D 25/0638 192/85.34 |
| 2009/0071787 A1* | 3/2009 | Hemphill | F16D 25/0635 192/3.29 |
| 2010/0179026 A1 | 7/2010 | Grochowski et al. | |
| 2012/0138412 A1* | 6/2012 | Rogne | F16D 25/0638 192/85.23 |
| 2018/0023635 A1* | 1/2018 | Neelakantan | F16D 11/14 475/149 |

FOREIGN PATENT DOCUMENTS

| | | |
|---|---|---|
| WO | 2014095630 A1 | 6/2014 |
| WO | 2015040158 A1 | 3/2015 |

\* cited by examiner

HYDRAULIC COUPLING

This application claims the benefit of Swedish Application No. 1550719-7 filed Jun. 3, 2015, and PCT Application No. EP2016/062453 filed Jun. 2, 2016.

TECHNICAL FIELD

The present invention relates to hydraulic couplings for systems distributing torque between the wheels and/or the axles of a vehicle, more specifically the invention is related to locking of hydraulic couplings.

BACKGROUND

In AWD systems using a hydraulic power source there is in some applications a demand of an added locking function during key off. For example, the vehicle may be parked on a hill and during this condition torque distribution to all wheels is desired. As it is not possible to guarantee a complete leakage free solution over life time, it may be preferred to lock the AWD coupling mechanically instead of using a compressed volume of oil behind a piston that compresses a disc package of the AWD coupling. Furthermore, a mechanical lock system could also be used for unloading the hydraulic power source of the AWD coupling in some off road driving situation, such as sand driving.

SUMMARY

It is an object of the present invention to provide a hydraulic coupling for a system distributing torque between the left and right wheels and/or the front and rear axles of a vehicle wherein the coupling is mechanically lockable by an integrated locking arrangement. By providing a mechanically lockable coupling, the hydraulic pressure in the coupling can be removed while still maintaining a secure engagement such that the input and output of the coupling remains connected.

Subject to the present invention is the concept set forth in the appended independent claims; preferred embodiments thereof being defined in the related dependent claims.

In a first aspect of the invention, a hydraulic coupling for a system distributing torque between the left and right wheels and/or the front and rear axles of a vehicle is provided. The coupling comprises a hydraulic pump, a disc package and a coupling piston acting thereon, said coupling piston being actuated by an hydraulic pressure generated by the hydraulic pump in order to distribute the torque from an input to an output of the coupling. The coupling piston is configured to be mechanically locked by an integrated locking arrangement such that the coupling remains engaged whereby the input is connected to the output of the coupling without hydraulic pressure acting on the coupling piston. Said locking arrangement is configured to convert a rotational movement to an axial movement upon actuation, wherein said axial movement is used for pressing the coupling piston towards the disc package. This is avoided by a mechanical locking of the coupling, such that the disc package remains sufficiently compressed without the hydraulic pump having to provide any hydraulic pressure. By integrating the locking arrangement such that a rotational movement of at least one part of the locking arrangement is converted to an axial movement of at least one other part of the locking arrangement pressing towards the coupling piston, the locking is secured in a safe way and the locking arrangement is compact and easy to actuate. Furthermore, the vehicle and the coupling may be completely powerless still without losing the engagement/locking of the coupling such that the coupling can be used e.g. to keep a vehicle in a parked position while parked on an inclined road.

In one embodiment, the locking arrangement comprises an actuator and wherein the locking and unlocking of the coupling only can be performed by said actuator. This ensures that the actuator is the only means by which the coupling may be locked and unlocked. I.e. unless the actuator is powered to lock or unlock the coupling, the locking arrangement will remain in the current position regardless of other forces acting on the locking arrangement providing a secure lock.

According to an embodiment, the actuator comprises a gear rack piston actuated by pressure generated by the hydraulic pump of the coupling. For this, a valve or other hydraulic source for controlling the flow of hydraulic fluid to the actuator is provided. By actuating the locking arrangement with pressure supplied by the hydraulic pump of the coupling, the locking arrangement is integrated such that that no external means for powering the locking arrangement is required.

The gear rack piston may comprise a first and second opposite facing surfaces exposable to a pressure generated by the hydraulic pump, and wherein the first surface has a larger surface area than the second surface such that when both surfaces are exposed to an equal pressure the piston will be biased for movement in one direction. The two opposite facing surfaces with different surface areas makes it possible to actuate the gear rack piston in an easy way by only controlling the pressure supplied to one of the surfaces. The first and second opposite surfaces are configured to be facing in essentially an axial direction of the gear rack piston, such that axial movement in two directions can be controlled by alternating the pressure acting on the first and second surfaces. Furthermore, the pressure on the first, small surface can be configured to be directly connected to the hydraulic pump such that it is always exposed to the pressure provided by the pump. However, since the opposite facing surface, i.e. the second surface, is larger it will generate a larger force when being exposed to the same pressure. Thus is it sufficient to only control the pressure on one of the two surfaces to control the gear rack piston.

The locking arrangement may further comprise a valve for controlling the exposing of at least one of the surfaces of the piston to the pressure generated by the hydraulic pump. The valve allows the actuation of the gear rack piston to be accurately controlled. Only one of the first and second opposite surfaces, preferably the first surface i.e. the larger surface, on the gear rack piston needs to be controlled by the valve for controlling the movement of the gear rack piston.

The actuator for the locking arrangement may be configured to actuate the locking arrangement independent of the pressure generated by the pump of the hydraulic coupling. Actuating the locking arrangement independently of the pressure supplied by the pump allows the locking and unlocking of the coupling to be performed regardless of the hydraulic pressure in the coupling. The actuating can be performed e.g. by an electric motor, a linear actuator or pneumatic piston etc.

The locking arrangement may further comprise a locking member being reciprocally moveable between an unlocked position and a locked position, wherein the locking member presses against the coupling piston in said locked position. The locking member provides a step-less way of mechanically locking the coupling, the locking member being moveable by an indirect or direct association to the actuator. The locking member is configured to be able to lock the coupling piston in different positions since the position of the coupling piston when the coupling is engaged can vary due to wear of disc package etc.

The locking arrangement may further comprise a converting member, and the locking member and the converting member may be essentially ring shaped and arranged concentric with the coupling piston. The diameters of the converting member and the locking member are such that the force, when in its locked position, from the locking member is distributed evenly on the coupling piston. The converting member allows the movement of the actuator to be converted into a movement of the locking member. Furthermore, an even distribution of the force from the locking member ensures that pressure/force that is required for locking the coupling is minimized and that no slip is allowed in the disc package.

The converting member may convert the movement of the actuator to movement of the locking member, such that movement of the actuator generates rotational movement of the converting member in turn generating translational movement of the locking member along the axial direction of the coupling piston. The movement of the actuator, the converting member and the locking member may therefore be in different planes or directions such that the space required for the locking arrangement can be minimized.

The converting member may have an internal thread in engagement with a corresponding external thread on the locking member, and the locking member may be rotationally fixed while the converting member is axially fixed such that rotational movement of the converting member translates into translational movement of the locking member. The thread allows control of the locking member by the converting member and moreover by changing the helix angle of the thread, the properties of the locking arrangement can be altered. The locking member is fixed by means of a blocking member and a pin, wherein the blocking member has portions extending inwards radially being in engagement with corresponding notches in the locking member. The pin secures the blocking member in the coupling housing such that rotating motion of the blocking member, and the locking member indirectly, is restricted. The converting member is fixed for axial motion by a retaining ring attached in the coupling housing. Thus may the rotating movement of the converting member be translated or converted to a translational axial movement of the locking member.

The converting member may comprise external cogs for engagement with corresponding cogs on the actuator. The engagement between the actuator and the converting member allows the actuator to control the locking member.

The thread may be a self locking thread, such that translational movement of the locking member only can be achieved by movement of the actuator. It is thus ensured that no movement of the locking member is allowed by an external force e.g. from the coupling piston acting on the locking member. The self-locking properties are achieved by applying an appropriate helix angle to the thread, and whereby also the benefit of a low required force for actuation of the locking member can be achieved.

According to a second aspect, a system is provided for distributing torque between the left and right wheels and/or the front and rear axles of a vehicle, wherein the system comprises a hydraulic coupling according to the first aspect, a control unit connected to said coupling and said vehicle, said control unit being arranged to control the locking arrangement in response to at least one input signal. The input signal to the control unit may arrive from the vehicle, either through a user of the vehicle manually requesting the locking of the coupling and/or the vehicle automatically requesting the locking for instance when the vehicle is parked. The input signal may also arrive directly from the coupling, e.g. from temperature, torque, voltage and/or rpm sensors etc detecting a state in which the coupling should be locked. The locking arrangement of the coupling is therefore configured to lock or unlock automatically depending on conditions of the vehicle and/or manually by the request of a user.

The control unit may control the movement of the actuator by controlling the position of the valve. By controlling the position of the valve, the control unit controls which way the locking member moves. Thus, the locking arrangement can be controlled by only using the pressure already supplied by the hydraulic pump of the coupling and the locking can be regulated by the control unit controlling the valve.

According to a third aspect of the invention, a method for locking and unlocking a hydraulic coupling for a system distributing torque between the left and right wheels and/or the front and rear axles of a vehicle is provided. The coupling comprises a hydraulic pump, a disc package and a coupling piston acting thereon, said coupling piston being actuated by an hydraulic pressure generated by the hydraulic pump in order to distribute the torque from an input to an output of the coupling. The coupling piston is configured to be mechanically locked by a locking arrangement according to the first aspect. The method comprises the steps of actuating the locking arrangement thus providing a rotational movement of at least one part of the locking arrangement, and converting the rotational movement to an axial movement of another part of the locking arrangement, wherein said axial movement is used for pressing the coupling piston towards the disc package. Thereby is a fail safe way of actuating the locking arrangement provided such that the locking can be maintained without powering the vehicle or the coupling.

BRIEF DESCRIPTION OF DRAWINGS

The invention will be described in further detail below under reference to the accompanying drawings, in which.

DETAILED DESCRIPTION

Figure 1:
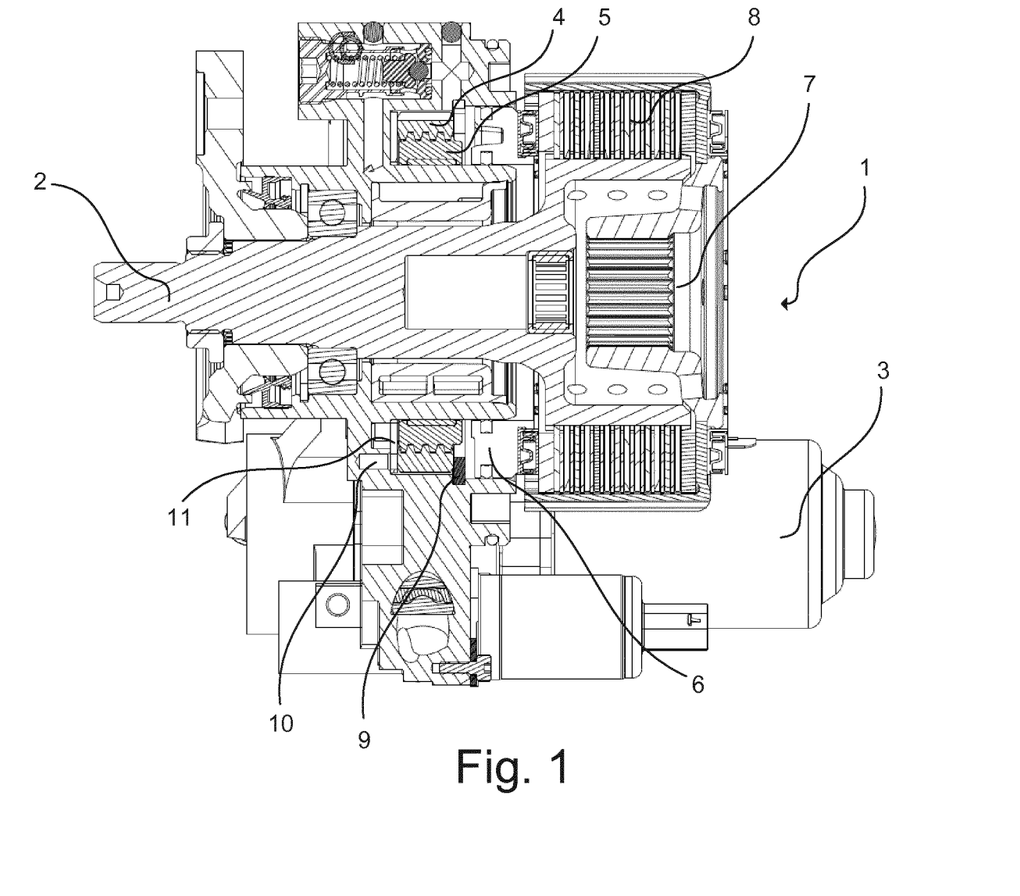
FIG. 1 is a cross-sectional view of a hydraulic coupling according to one embodiment.

FIG. 1 shows a hydraulic coupling 1 according to one embodiment of the invention, in this case a limited slip coupling which may be used for distribution of torque between the front and rear axles of an all wheel drive vehicle and/or distribution of torque between left and right wheels of a two wheel drive or four wheel drive vehicle. Other examples where the coupling can be applied may e.g. include hybrid drive cars, in which one or more of the axles are driven by means of an electrical motor. Also, examples using purely electric drive cars may be envisaged.

The coupling 1 comprises a disc package 8 which is actuated by means of a coupling piston 6. When the coupling piston 6 is actuated by means of hydraulic pressure generated by the hydraulic pump 3, the discs of the disc package 8 will get into contact with each other and establish driving contact between the input 2 and output 7 to which they are connected. The coupling further comprises an integrated locking arrangement 23 for locking the coupling piston 6 mechanically.

This enables the coupling piston 6 to compress the disc package 8 in a regular manner, thereby establishing the driving contact or engagement between the input 2 and the output 7. When the contact has been established, the locking arrangement 23 is arranged to, when requested, lock the coupling piston 6 such that the compression of the disc package 8 can be maintained or even slightly increased even if the hydraulic pressure sinks or is removed completely. This allows the coupling 1 to maintain the engaged mode, i.e. the contact between the input 2 and the output 7 while removing the need for the hydraulic pump 3 to simultaneously provide a high oil pressure. Furthermore, this also means that the coupling and/or vehicle can be switched of such that it is completely powerless with the coupling still being able to maintain the contact between the input 2 and output 7. This may be advantageous in e.g. a situation where the vehicle 21 is parked in an incline, and where a mechanically engaged coupling ensures that the vehicle is securely kept from rolling away. Furthermore, since the locking arrangement only locks the coupling piston 6 for movement towards an unengaged position, the coupling piston 6 may still be pressed by the hydraulic pump 3 further towards the disc package 8. This facilitates unlocking of the coupling 1 by simply raising the hydraulic pressure to relieve the locking arrangement from the locking force from the coupling piston 6. The locking arrangement 23 is configured to lock the hydraulic piston 6; however it is not configured to be able to move the coupling piston on its own even though it provides some additional pressure to coupling piston 6.

Figure 6:
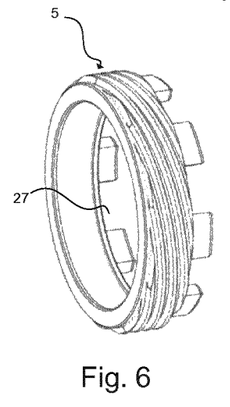
FIG. 6 shows a locking member according to one embodiment.
Figure 9:
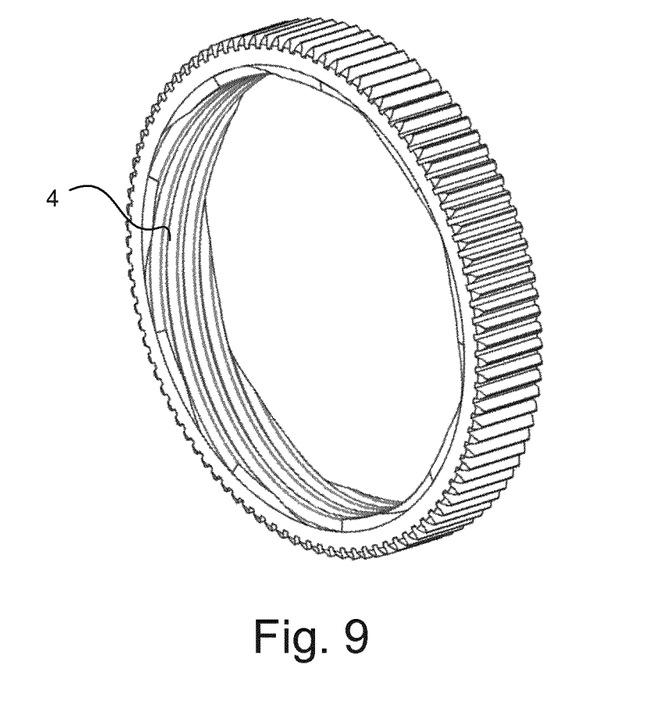
FIG. 9 shows a converting member according to one embodiment.

The locking arrangement 23 further comprises a locking member 5 and a converting member 4 as can be seen in FIG. 6 and FIG. 9. The converting member 4 and the locking member 5 are in engagement with each other, preferably through a thread such that turning or rotation of the converting member 4 in different directions is converted into a reciprocal translational movement in the axial direction of the locking member 5. In one embodiment, the converting member 4 has an internal thread in engagement with a corresponding external thread on the locking member 5, and wherein the locking member 5 is rotationally fixed and the converting member 4 is axially fixed such that rotational movement of the converting member 4 translates into axial translational movement of the locking member 5. I.e. the converting member 4 is positioned circumferentially outside the locking member 5, being concentric with each other and with the coupling piston 6.

Figure 7:
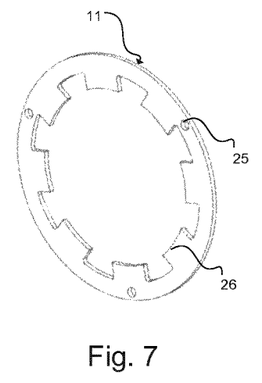
FIG. 7 shows a blocking member according to one embodiment.

To ensure that the locking member 5 only can move in the axial direction, the locking arrangement further comprises a blocking member 11 (see FIG. 7) and a pin 10. The blocking member 11 having a circular, washer-like shape with a central hole with inwardly extending radial portions 26 that are in sliding engagement with corresponding axial notches 27 in the locking member 5. The portions 26 and notches 27 can have any corresponding shapes that are suitable for sliding engagement with each other. The pin 10 is fitted into a hole 25 in the blocking member 11 and in a corresponding hole in the coupling housing such that rotational movement of the blocking member 11 and thereby the locking member 5 is prevented.

Figure 8:
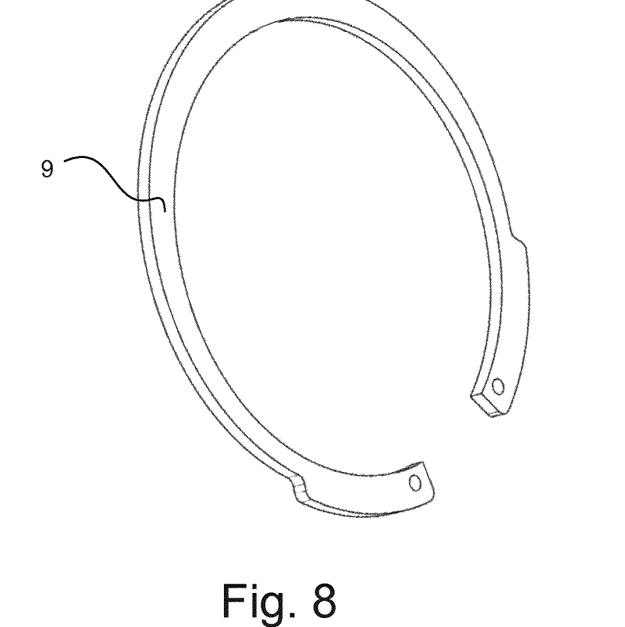
FIG. 8 shows a retaining ring according to one embodiment.

The converting member 4 is fixed for preventing axial movement by a retaining ring 9, as can be seen in FIG. 8.

Figure 10:
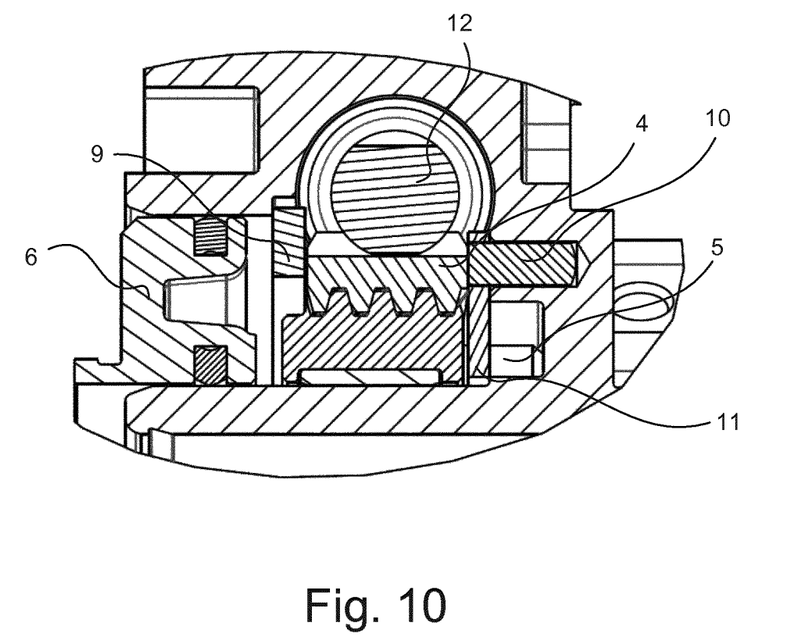
FIG. 10 shows the locking arrangement in an unlocked position.
Figure 11:
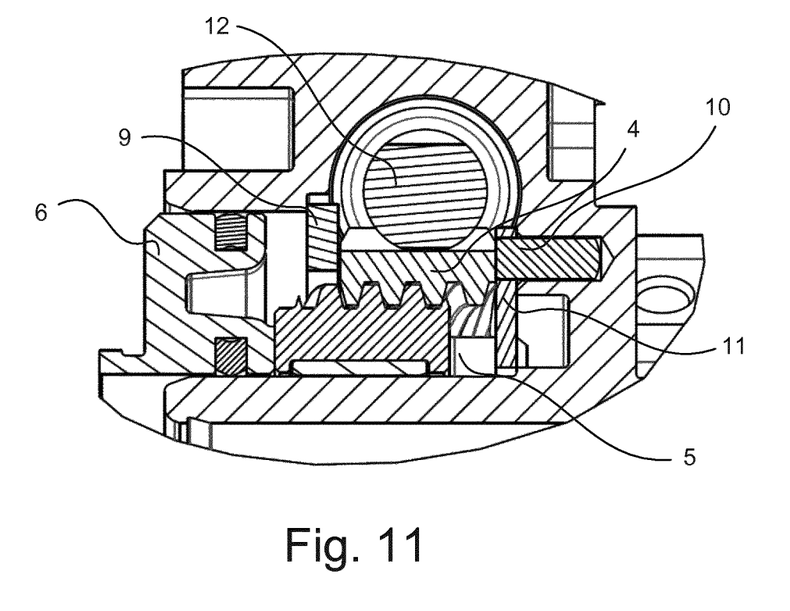
FIG. 11 shows the locking arrangement in a locked position.

The locking member 5 is moveable between two end positions (as can be seen in FIG. 10 and FIG. 11), one end position being an unlocked position such that the coupling piston 6 may move freely. The other end position being a locked position in which the locking member 5 presses against the coupling piston 6 such that the coupling piston 6 is unable to move back in the direction of the locking member 5. The locking member 5 moves forward until it contacts the coupling piston 6, this is ideally when the piston 6 is in a position such that the coupling 1 is fully engaged. However since the coupling piston 6 moves back and forth, it is also possible to lock the piston 6 in different positions in a similar way. The locking member 5 applies additional force to the coupling piston 6 increasing the contact force between the piston 6 and the disc package 8 by around 5-10% depending on the circumstances. This also ensures that any slip that might cause wear of the discs in the disc package 8 is minimized.

Figure 2:
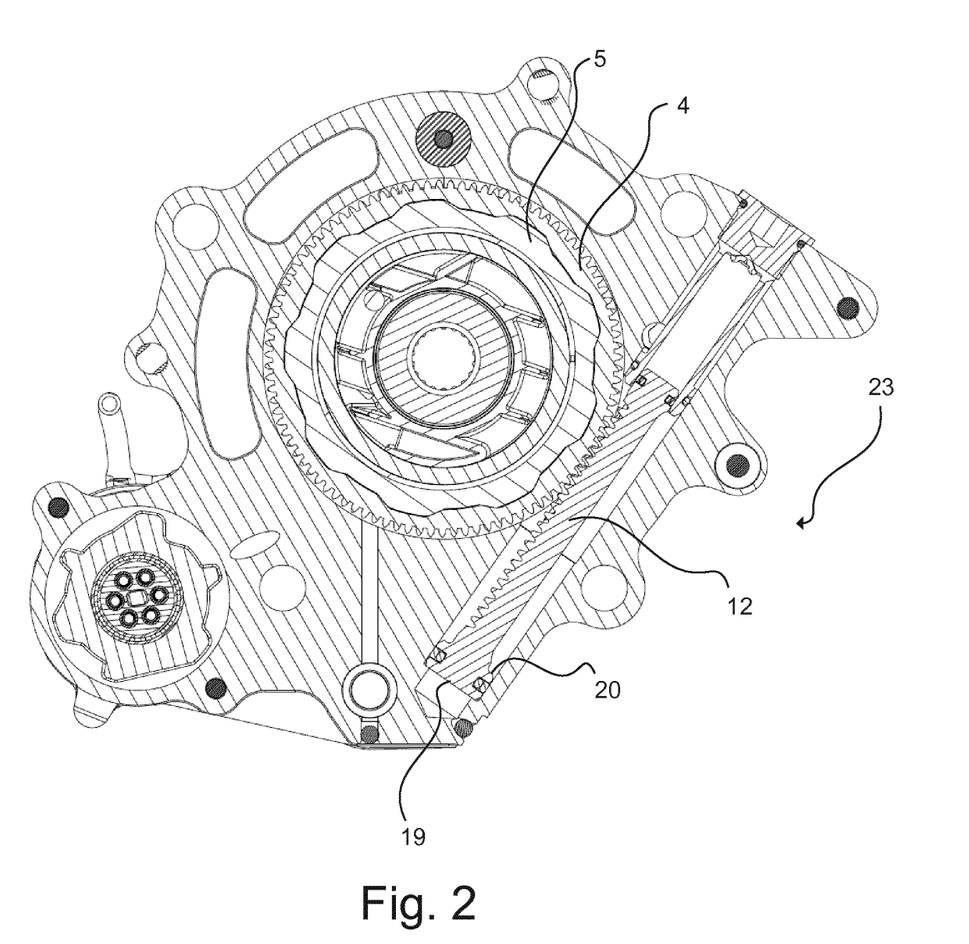
FIG. 2 is a cross-sectional view of the locking arrangement in a hydraulic coupling according to one embodiment.

FIG. 2 shows a cross-sectioned view of the locking arrangement 23 according to one embodiment of the invention. The locking arrangement comprises an actuator 12 in order to control the locking and unlocking of the coupling 1. The locking arrangement 23 is arranged such that locking and unlocking of the coupling only can be performed by said actuator 12. This is achieved by the thread of the locking member 5 and the converting member 4 being a self locking thread, i.e. that the helix angle of the thread is such that the friction that arises in the thread overcomes any axial force on the locking member 5 or the converting member 4. This also has the effect that little force is needed when rotating the converting member 4 to move the locking member 5.

The converting member 4 is rotated by the actuator 12, in this case being shown as a gear rack piston 12 in turn being powered by the pressure generated by the hydraulic pump 3. However, it is possible that the actuator 12 for the locking arrangement 23 is arranged to actuate the locking arrangement 23 independent of the pressure generated by the pump 3 of the hydraulic coupling 1. This means that the actuator may be a linear actuator coupled to a gear rack, or an electric motor and a gear in engagement with the converting member etc.

It is nevertheless beneficial to be able to actuate the locking arrangement 23 by the pressure provided by the hydraulic pump 3 since this minimizes the needed number of active components of the locking arrangement 23.

As can be seen in FIG. 2, the gear rack piston 12 comprises a first and a second opposite facing surfaces 19, 20 exposable to the pressure generated by the hydraulic pump 3. The first surface 19 has a larger surface area than the second surface 20 such that when both surfaces 19, 20 are exposed to an equal pressure the piston will be biased for movement in one direction. This means that during normal operation, the second surface 20 can be constantly exposed to the pressure from the hydraulic pump 3 such that the coupling 1 is unlocked. However, as soon as locking of the coupling 1 is desired, both surfaces 19, 20 can be exposed to equal hydraulic pressure and the locking will occur. This means that simple control of the gear rack piston 12 is achieved by only controlling the pressure that is supplied to the larger surface 19.

The gear or cogs on the gear rack piston 12 are in engagement with corresponding external cogs on the converting member 4 such that movement of the piston 12 creates rotational movement of the converting member 4, in turn creating axial translational movement of the locking member 5.

Figure 3:
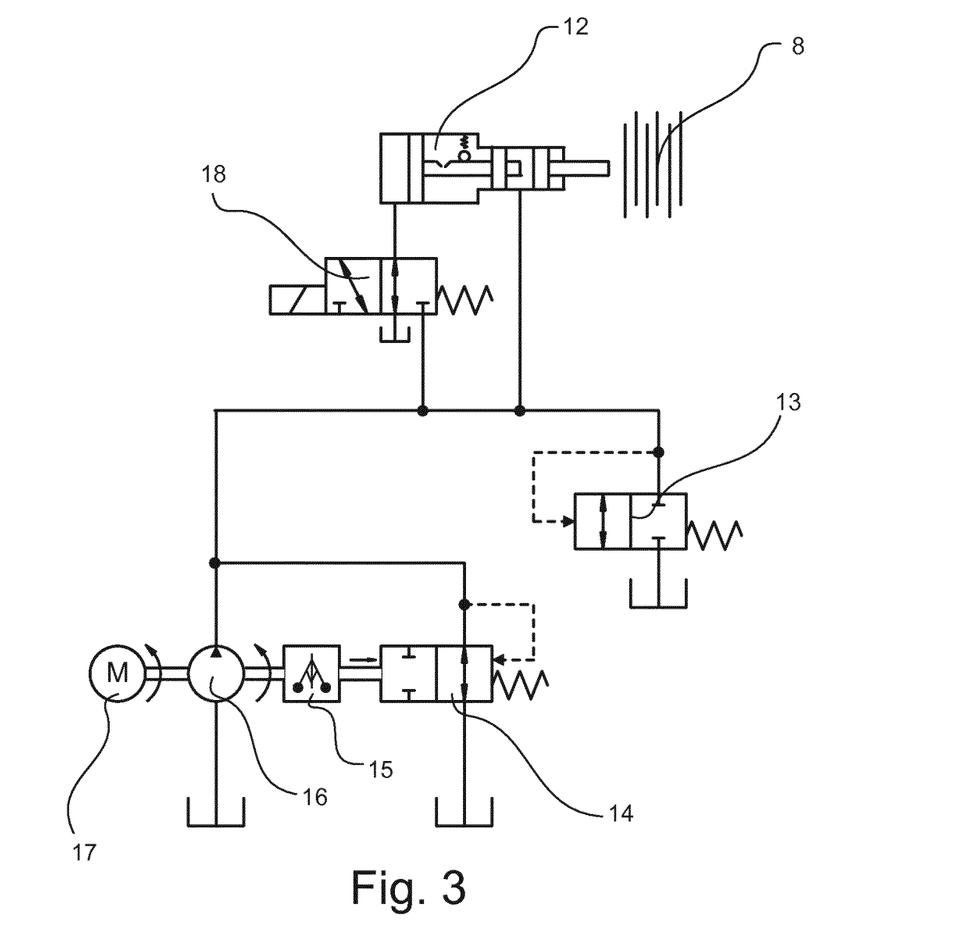
FIG. 3 is a schematic outline of a hydraulic system in a hydraulic coupling according to one embodiment of the invention.

FIG. 3 shows a hydraulic scheme according to one embodiment of the invention, showing a possible outline of the hydraulic system. The hydraulic system comprises an electric motor 17, driving a pump 16, which may also drive a centrifugal regulator 15. The position of the centrifugal regulator 15 controls the position of, and flow through, a pressure overflow valve 14.

Hydraulic oil for the hydraulic actuator system is contained in a reservoir. It is sucked into the pump 16 through a hydraulic line and is delivered therefrom to provide pressure to the coupling piston 6. Depending on the position of the centrifugal regulator 15 and thus the pressure overflow valve 14, a portion and sometimes all of the hydraulic flow is diverted through the overflow valve 14 and back to the reservoir. The result is that the hydraulic pressure delivered on the coupling piston 6 is governed by the centrifugal regulator 15. The coupling piston 6 acts on the disc package 8.

A relief valve 13 is connected to the hydraulic system. The relief valve 13 has the purpose of diverting hydraulic oil to the reservoir, when the pressure exceeds a certain level, for example 40 bar.

Furthermore, the hydraulic system comprises a valve 18 being arranged to control the exposing of one or both of the surfaces 19, 20 of the piston 12 to the pressure generated by the hydraulic pump 16. The valve 18 comprising at least two positions, one in which the first surface 19 (i.e. the larger surface) only is connected to the pressure in the reservoir which is substantially lower or at least never exceeding the pressure provided by the pump 3. In the second position, the valve 18 exposes the first surface 19 of the piston 12 to the pressure provided hydraulic pump such that essentially equal pressure acts on the first 19 and the second surface 20 of the piston 12.

The second surface 20 of the gear rack piston 12 may be constantly exposed to the pressure from the hydraulic pump 16 such that unlocking of the coupling 1 is simply performed by raising the pressure with the pump 16, given that the valve 18 is positioned such that only the second surface 20 of the piston is exposed to the pressure. Since the locking member 5 and the coupling piston 6 are pressing against each other when locked, the pressure needed for unlocking the coupling 1 is essentially the same as the pressure that was present when the locking occurred.

Figure 4:
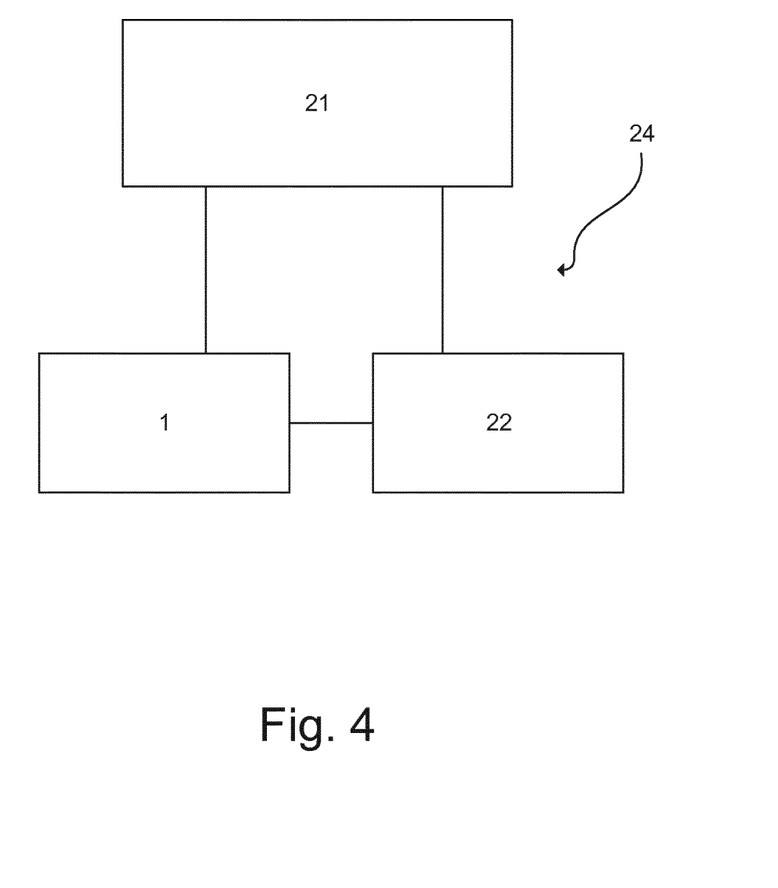
FIG. 4 shows a system comprising a vehicle, a hydraulic coupling and a control unit according to one embodiment.

FIG. 4 shows a system 24 for distributing torque between the left and right wheels and/or the front and rear axles of a vehicle 21 according to one aspect of the invention. The system 24 comprises a vehicle 21, a hydraulic coupling 1 according to the invention comprising a mechanical locking arrangement 23.

The system 24 further comprises a control unit 22 connected to said coupling and said vehicle 21, said control unit 22 being arranged to control the locking arrangement 23 in response to at least one input signal. It is to be understood that the outline in FIG. 4 is only functional; physically the components of the system 24 may be arranged integrated in each other in various arrangements.

The control unit is arranged to control the actuator 12, either directly or by controlling the position of the valve 18. The input signal to the control unit 22 may arrive from the vehicle 21, either through a user of the vehicle 21 manually requesting the locking of the coupling 1 and/or the vehicle automatically requesting the locking for instance when the vehicle 21 is parked. The input signal may also arrive from the coupling 1, e.g. from temperature, torque, voltage and/or rpm sensors detecting a state in which the coupling 1 should be locked.

Figure 5:
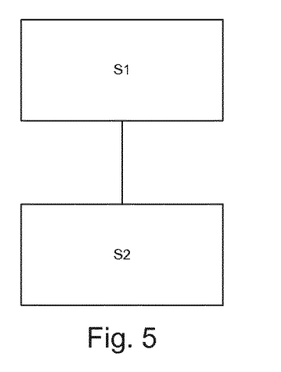
FIG. 5 shows a method for locking and unlocking a hydraulic coupling according to one embodiment of the invention.

FIG. 5 shows a method for locking and unlocking a hydraulic coupling wherein the method comprises the steps of actuating the locking arrangement 23 thus providing a rotational movement of at least one part of the locking arrangement 23, and converting the rotational movement to an axial movement of another part of the locking arrangement 23, wherein said axial movement is used for pressing the coupling piston 6 towards the disc package 8. Thereby the coupling piston 6 is configured to be locked by the locking arrangement 23 in a predetermined position.

The method can further comprise a step in which the control unit 22 firstly receives an input signal from the vehicle 21 and/or the coupling 1 and in response to said input signal controls the actuation of the locking arrangement 23 and thus the locking of the coupling 1 as described above. Ideally, the coupling piston 6 is actuated by the pressure supplied by the pump 3, by the control unit 22 controlling a valve of the locking arrangement such that the gear rack piston 12 moves in the requested direction. The locking arrangement 23 is configured to lock the coupling piston 6 such that the coupling 1 can remain engaged even when the pressure drops or is removed completely. Unlocking of the system is performed by the pump 3 raising the pressure in the coupling 1 such that the coupling piston 6 is pressed towards the disc package 8. This relieves the locking member 5 from the locking force from the coupling piston 6 such that it is easy to move back the locking member 5 to an unlocked position. Furthermore, during unlocking or normal operation of the coupling 1, the valve is configured to only allow the first smaller surface 19 of the gear rack piston 12 to be exposed to the pressure by the pump, thus moving it towards and keeping the gear rack piston 12 in the unlocked position.

Figure 12:
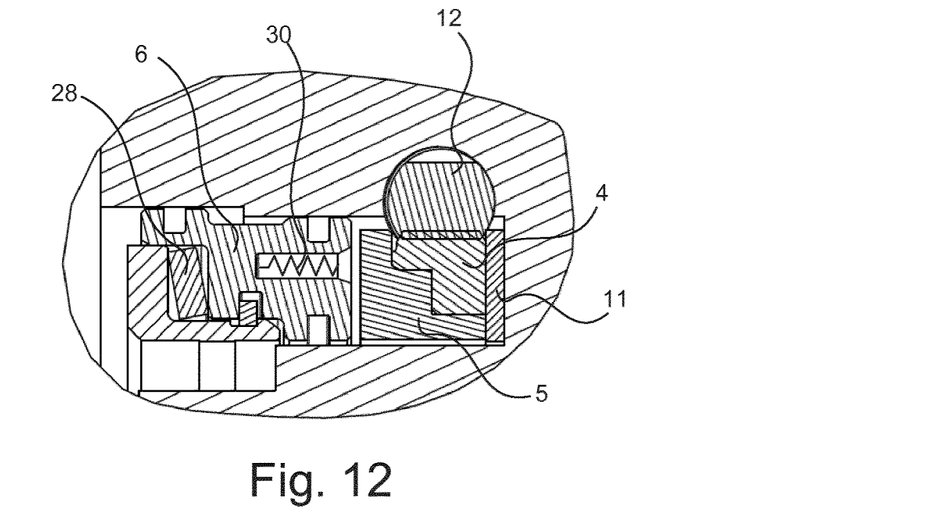
FIG. 12 is a cross sectional view of an elastic element in the hydraulic coupling.

To avoid that the force change due to different temperature expansion between aluminium and steel, an elastic element with a preloaded disc spring 28 is provided in serial with the disc package 8 and the piston 6. The elasticity is affected when a mechanical at maximum torque level (park lock function) is reached, since it is desired to avoid that the locking torque rise or decrease substantial when the vehicle is parked. This is shown in FIG. 12.

Figure 13:
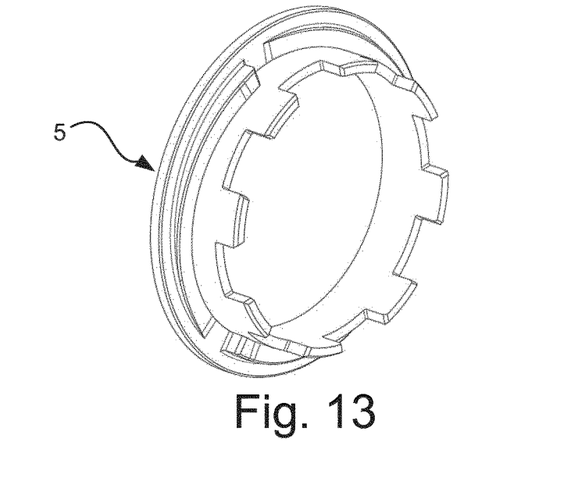
FIG. 13 shows a first cam curve part according to one embodiment.
Figure 14:
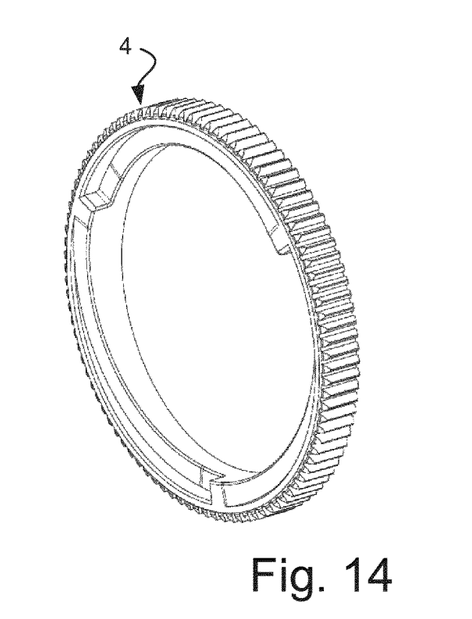
FIG. 14 shows a second cam curve part according to one embodiment.

In one embodiment, in order to disconnect the coupling 1 such that a gap is provided between the discs in the disc package 8, a cam curve is used instead of a thread. The two cam curve parts 4, 5 are shown in FIGS. 13 and 14. In that way, the piston 1 can move forward to the kiss point with a different screw angle compared to when torque (elasticity mode of the coupling) is building up. The two cam curve parts 4, 5 are holding together axially with an axial spring 30 in the piston 1.

The invention claimed is:

1. A hydraulic coupling for a system distributing torque between a left wheel and a right wheel or a front axle and a rear axle of a vehicle, the hydraulic coupling comprises a hydraulic pump, a disc package and a coupling piston acting thereon, said coupling piston being actuated by a hydraulic pressure generated by the hydraulic pump in order to distribute torque from an input to an output of the hydraulic coupling, wherein the coupling piston is configured to be mechanically locked by an integrated locking arrangement, when the coupling piston is actuated to act on the disc package, such that the hydraulic coupling remains engaged when the hydraulic pressure is completely removed whereby the input is connected to the output of the hydraulic coupling without hydraulic pressure acting on the coupling piston, and wherein unlocking of the hydraulic coupling is provided by again actuating the coupling piston.

2. The hydraulic coupling according to claim 1, wherein said locking arrangement comprises a locking member and a converting member and is configured to convert a rotational movement of the converting member to an axial movement of the locking member upon actuation, wherein said axial movement is used for pressing the coupling piston towards the disc package.

3. The hydraulic coupling according to claim 1, wherein the locking arrangement comprises an actuator and wherein locking and unlocking of the hydraulic coupling only is performed by said actuator.

4. The hydraulic coupling according to claim 3, wherein the actuator comprises a gear rack piston configured to be actuated by pressure generated by the hydraulic pump of the hydraulic coupling.

5. The hydraulic coupling according to claim 4, wherein the gear rack piston comprises a first and second opposite facing surfaces exposable to a pressure generated by the hydraulic pump, and wherein the first surface has a larger surface area than the second surface such that when both surfaces are exposed to an equal pressure the piston is biased for movement in one direction.

6. The hydraulic coupling according to claim 5, wherein the locking arrangement further comprises a valve for controlling the exposing of at least one of the surfaces of the gear rack piston to the pressure generated by the hydraulic pump.

7. The hydraulic coupling according to claim 3, wherein the actuator for the locking arrangement is configured to actuate the locking arrangement independent of the pressure generated by the pump of the hydraulic coupling.

8. The hydraulic coupling according to claim 2, wherein the locking member is reciprocally moveable between an unlocked position and a locked position, and wherein the locking member is configured to press against the coupling piston in said locked position.

9. The hydraulic coupling according to claim 2, wherein the locking member and the converting member are essentially ring shaped and arranged concentric with the coupling piston and wherein the diameters of the converting member and the locking member are such that a force, when in its locked position, from the locking member is distributed evenly on the coupling piston.

10. The hydraulic coupling according to claim 9, wherein the converting member is configured to convert the movement of the actuator to movement of the locking member, such that movement of the actuator generates rotational movement of the converting member in turn generating translational movement of the locking member along an axial direction of the coupling piston.

11. The hydraulic coupling according to claim 10, wherein the converting member has an internal thread in engagement with a corresponding external thread on the locking member, and wherein the locking member is rotationally fixed and the converting member is axially fixed such that rotational movement of the converting member is translated into translational movement of the locking member.

12. The hydraulic coupling according to claim 9, wherein the converting member comprises external cogs for engagement with corresponding cogs on the actuator.

13. The hydraulic coupling according to claim 11, wherein the internal thread is a self locking thread, such that translational movement of the locking member only can be achieved by movement of the actuator.

14. A system for distributing torque between a left wheel and a right wheel or a front axle and a rear axle of a vehicle, the coupling comprises a hydraulic pump, a disc package and a coupling piston acting thereon, said coupling piston being actuated by a hydraulic pressure generated by the hydraulic pump in order to distribute torque from an input to an output of the hydraulic coupling, wherein the coupling piston is configured to be mechanically locked by an integrated locking arrangement, when the coupling piston is actuated to act on the disc package, such that the hydraulic coupling remains engaged when the hydraulic pressure is completely removed whereby the input is connected to the output of the hydraulic coupling without hydraulic pressure acting on the coupling piston, and wherein unlocking of the hydraulic coupling is provided by again actuating the coupling piston, a control unit connected to said hydraulic coupling and said vehicle, said control unit being configured to control the locking arrangement in response to at least one input signal.

15. The system for distributing torque according to claim 14, wherein the control unit is configured to control the movement of an actuator by controlling the position of a valve.

16. A method for locking and unlocking a hydraulic coupling for a system distributing torque between a left wheel and a right wheel or a front axle and a rear axle of a vehicle, the coupling comprises a hydraulic pump, a disc package and a coupling piston acting thereon, wherein the method comprises:
   mechanically locking the hydraulic coupling by (i) actuating the coupling piston such that the disc package is compressed, and (ii) mechanically locking the position of the coupling piston by means of a locking arrangement ensuring the position of the coupling piston also when no hydraulic pressure is acting on the coupling piston, and
   mechanically unlocking the hydraulic coupling by actuating the coupling piston whereby the locking arrangement is put in an unlocked position.

* * * * *